US008231068B2

(12) United States Patent
Sprouse et al.

(10) Patent No.: US 8,231,068 B2
(45) Date of Patent: Jul. 31, 2012

(54) DRY, LOW NITROUS OXIDE CALCINER INJECTOR

(75) Inventors: Kenneth M. Sprouse, Northridge, CA (US); Albert E. Stewart, Sylmar, CA (US)

(73) Assignee: Pratt & Whitney Rocketdyne, Inc., Canoga Park, CA (US)

( * ) Notice: Subject to any disclaimer, the term of this patent is extended or adjusted under 35 U.S.C. 154(b) by 2063 days.

(21) Appl. No.: 10/869,643

(22) Filed: Jun. 16, 2004

(65) Prior Publication Data

US 2005/0281722 A1  Dec. 22, 2005

(51) Int. Cl.
*B05B 1/24* (2006.01)
*B05B 1/00* (2006.01)
*B05B 1/28* (2006.01)

(52) U.S. Cl. ........ 239/128; 239/135; 239/290; 239/292; 239/294

(58) Field of Classification Search .................. 422/173; 239/336, 128, 135–139, 290, 292, 294
See application file for complete search history.

(56) References Cited

U.S. PATENT DOCUMENTS

| | | | |
|---|---|---|---|
| 3,400,921 A * | 9/1968 | Hemker | 266/138 |
| 4,323,538 A * | 4/1982 | Sinor | 422/207 |
| 4,642,047 A * | 2/1987 | Gitman | 432/13 |
| 4,952,218 A * | 8/1990 | Lipp et al. | 48/86 R |
| 5,954,855 A * | 9/1999 | Gitman et al. | 75/10.42 |
| 6,126,438 A * | 10/2000 | Joshi et al. | 431/161 |
| 6,682,838 B2 | 1/2004 | Stevens | 429/17 |
| 6,790,430 B1 | 9/2004 | Lackner et al. | 423/648.1 |
| 2002/0020364 A1* | 2/2002 | McEvoy et al. | 123/27 R |
| 2004/0214029 A1* | 10/2004 | Carey et al. | 428/647 |
| 2005/0173561 A1* | 8/2005 | Cotter et al. | 239/398 |

* cited by examiner

*Primary Examiner* — Matthew Merkling
(74) *Attorney, Agent, or Firm* — Carlson, Gaskey & Olds, P.C.

(57) ABSTRACT

An injection device transfers calcium carbonate particles for regeneration into calcium oxide. The device includes an injector body having an inlet end which receives a heated air volume, and a discharge end. At least one transfer tube disposed through a portion of the injector body discharges the calcium carbonate particles at the discharge end. At least one flow nozzle receives the heated air volume and discharges the heated air volume at the discharge end. Each flow nozzle is angularly oriented to directly impinge the plurality of calcium carbonate particles discharged from the transfer tube with the heated air volume. A flow splitter can also be connected to the device to split the calcium carbonate particles into multiple flow streams.

22 Claims, 6 Drawing Sheets

US 8,231,068 B2

DRY, LOW NITROUS OXIDE CALCINER INJECTOR

FIELD OF THE INVENTION

The present invention relates in general to hydrogen generation by steam reforming of natural gas and more specifically to a device and method for injecting calcium oxide into a calciner used in such a reforming process.

BACKGROUND OF THE INVENTION

The generation of hydrogen from natural gas via steam reforming is a well established commercial process. Natural gas is combined with steam in a hydrogen reactor where hydrogen and carbon dioxide are formed. One drawback is that commercial units tend to be extremely large in volume and subject to significant amounts of methane slip, identified as methane feedstock which passes through the reformer un-reacted. Excess carbon dioxide in the reactor slows down or stops the reaction, resulting in methane slip.

To reduce the size and increase conversion efficiency of the units, a process has been developed which uses calcium oxide to improve hydrogen yield by removing carbon dioxide generated in the reforming process. See U.S. patent application Ser. No. 10/271,406 entitled "HYDROGEN GENERATION APPARATUS AND METHOD", filed Oct. 15, 2002, commonly owned by the assignee of the present invention, the disclosure of which is incorporated herein by reference. The calcium oxide reacts with the CO2 in a separation reaction, producing a solid calcium carbonate ($CaCO_3$) and absorbing the CO2.

To regenerate a solid form of calcium oxide (CaO) for continued reaction with the CO2, the solid $CaCO_3$ particles can then be placed in a calciner wherein they are heated according to the following reaction: $CaCO_3 + \text{heat} \rightarrow CaO(s) + CO_2(g)$. This reaction drives off the carbon dioxide (CO2) gas leaving solid CaO particles. The solid CaO is then returned for reuse in the reforming process. Rotary kiln calcination units are known which can regenerate the solid CaO, but these units are detrimentally limited by their size, high operating temperature (commonly above 1523° C. (2800° F.)), and high residence time (greater than 3 seconds) which can result in scintering of the calcium particles and subsequently reduced capability of the regenerated CaO to react CO2. A further limitation on known calcium carbonate reuse processes is that known rotary kiln type calciner units produce appreciable quantities of nitrous oxide (NO1, NO2 or NO3, hereinafter referred to as NOx) pollutant because of their high operating temperatures (commonly above 1523° C. (2800° F.)).

SUMMARY OF THE INVENTION

According to a preferred embodiment of the present invention, an injection device adaptable to transfer a plurality of calcium carbonate particles for regeneration into calcium oxide includes an injector body having an inlet end adapted to receive a heated air volume, and a discharge end. At least one transfer tube is connectably disposed through a portion of the injector body which is operable to transfer the plurality of calcium carbonate particles and discharge the plurality of calcium carbonate particles at the discharge end. At least one flow nozzle is adaptable to receive the heated air volume and discharge the heated air volume at the discharge end. The at least one flow nozzle is angularly oriented to directly impinge the plurality of calcium carbonate particles discharged from the at least one transfer tube with the heated air volume.

According to another preferred embodiment of the present invention, a steam/methane reforming system operable to react a steam/methane volume to operably produce a hydrogen volume and a carbon dioxide volume includes a plurality of calcium oxide particles entrained in the steam/methane volume operable to react with the carbon dioxide volume to operably form a plurality of calcium carbonate particles. A calciner having an inlet is operable to reform the plurality of calcium carbonate particles into the plurality of calcium oxide particles. A calciner injector is disposed upstream of the calciner which is operable to discharge the plurality of calcium carbonate particles into the calciner. A volume of hot vitiated air is injectable into the calciner injector. A plurality of flow nozzles connectable to the calciner injector are operable to direct the volume of hot vitiated air to directly impinge with the plurality of calcium carbonate particles discharged from the calciner injector at the inlet to the calciner.

According to still another preferred embodiment of the present invention, a method for using a calciner injector to inject a plurality of calcium carbonate particles into a calciner for regeneration of the calcium carbonate particles into a plurality of calcium oxide particles includes: reacting the plurality of calcium oxide particles with a carbon dioxide volume to operably form the plurality of calcium carbonate particles; connecting a calciner injector to the calciner; transferring the plurality of calcium carbonate particles through at least one feed tube partially housed within the calciner injector into the calciner; flowing a volume of heated vitiated air through the calciner injector; and redirecting the volume of heated vitiated air into the plurality of calcium carbonate particles at an inlet to the calciner.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
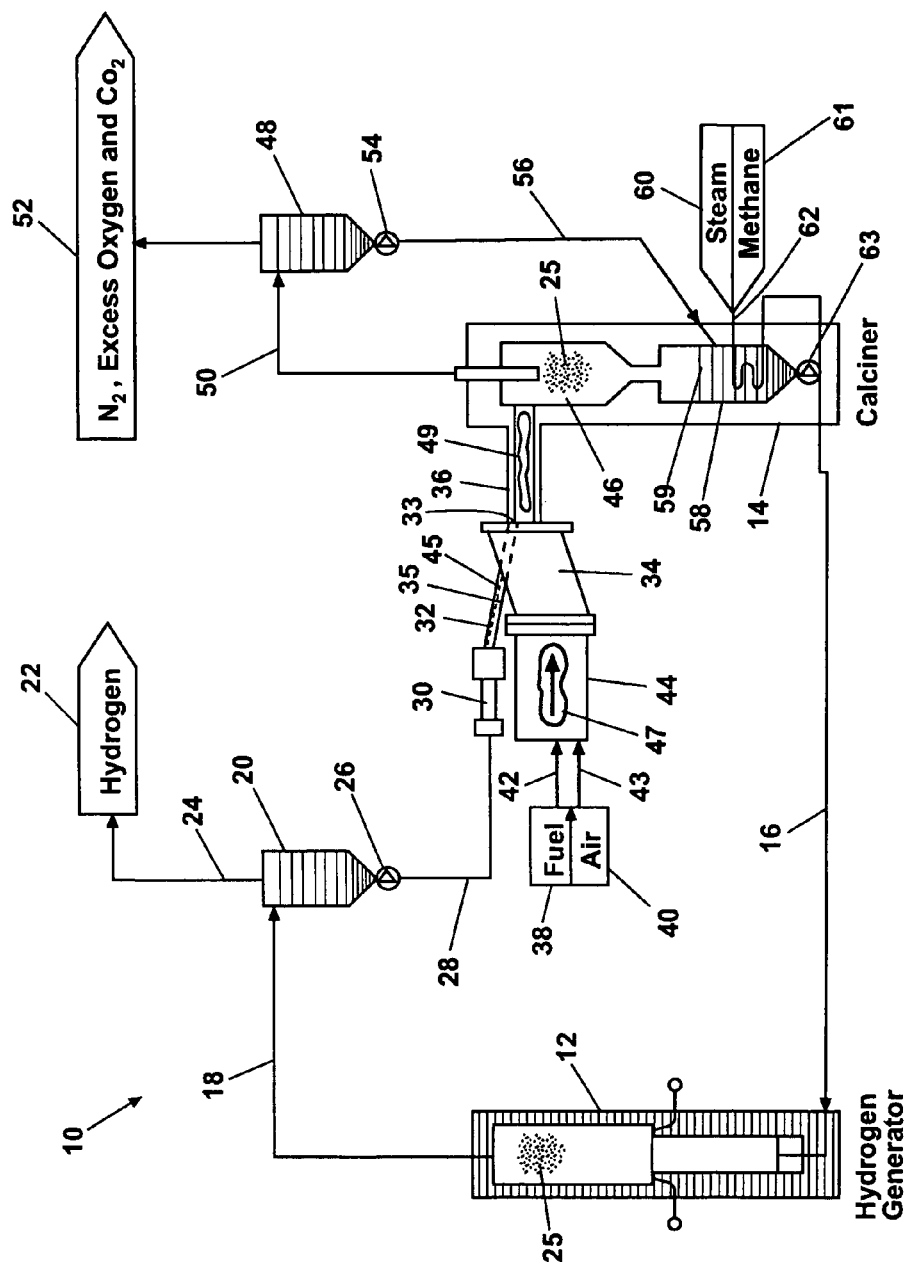
FIG. 1 is a diagrammatic representation of a reformation system having a dry low NOx calciner injector of the present invention.

Referring generally to FIG. 1, according to a preferred embodiment of the present invention, a reformation system 10 includes a hydrogen generator 12 which receives reaction products from a calciner 14 via a generator feed line 16. Discharge from the hydrogen generator 12 is provided via a generator discharge line 18 to a hydrogen cyclone separator 20. Hydrogen gas 22 is removed from hydrogen cyclone separator 20 via a hydrogen discharge line 24. A plurality of calcium carbonate (CaCO3) particles 25, which are entrained in the flow from hydrogen generator 12, are separated and removed from a bottom hopper portion of hydrogen cyclone separator 20. The calcium carbonate particles 25 are transferred via a transfer device 26 and a return line 28 back to calciner 14.

In return line 28 a flow splitter 30 can be disposed having at least one feed tube 32 discharging the calcium carbonate particles 25 from a discharge end 33 into a calciner injector 34. Feed tube 32 transfers the calcium carbonate particles 25 within an internal passage 35. Calciner injector 34 can be connected to a calciner inlet 36 of calciner 14. A fuel volume 38 and an air volume 40 can be connected via a fuel input line 42 and an air input 43 to a vitiated air generator 44. Vitiated air generator 44 can be directly connected to calciner injector 34. Details of vitiated air generator 44 are provided in U.S. patent application entitled "NON-SWIRL DRY LOW NOx (DLN) COMBUSTOR" filed Feb. 26, 2004, commonly owned by the assignee of the present invention, the disclosure of which is incorporated herein by reference. The hot vitiated air is rapidly directed into contact with the calcium carbonate particles, providing a vitiated air temperature ranging from approximately 1412° C. (2600° F.) to approximately 1523° C. (2800° F.) at velocities ranging from about 61 m/sec (200 ft/sec) to 76.2 (250 ft/sec) within calciner injector 34.

Calciner inlet 36 can be connected to a cyclone separator 46 within calciner 14. A discharge cyclone separator 48 can receive, via a gas discharge line 50, substantially all the nitrogen, excess oxygen, and carbon dioxide gases 52 discharged from calciner 14 as well as a portion of the calcium carbonate particles 25 discharged from cyclone separator 46. Nitrogen, excess oxygen, and carbon dioxide discharge gases 52 can be directly discharged from discharge cyclone separator 48. Discharge cyclone separator 48 can also accumulate the portion of calcium carbonate particle carryover from cyclone separator 46 in a lower hopper section of discharge cyclone separator 48. From discharge cyclone separator 48, a transfer device 54 can transfer the portion of calcium carbonate particles 25 from discharge cyclone separator 48 via a calciner input line 56 to a hopper 58 of calciner 14. Calcium carbonate particles 25 in cyclone separator 46 are regenerated into calcium oxide particles 59 which are collected in a hopper 58 for transfer back to hydrogen generator 12. Regeneration of the calcium carbonate particles can also generate a carbon dioxide gas in calciner 14. The carbon dioxide gas can be discharged from calciner 14 via discharge cyclone separator 48 as previously described. A steam supply 60 and a methane supply 61 can be connected to calciner 14 and a steam/methane mixture 62 together with the regenerated calcium oxide particles 59 can be transferred via transfer device 63 to hydrogen generator 12.

During operation of reformation system 10, hydrogen generator 12 reacts steam from steam supply 60 and methane from methane supply 61 to generate hydrogen and carbon dioxide. The carbon dioxide is removed from hydrogen generator 12 by reaction with the calcium oxide particles 59 entrained with steam/methane mixture 62. The hydrogen 22 is removed via hydrogen cyclone separator 20 as previously discussed. As the calcium oxide particles 59 absorb the carbon dioxide, calcium carbonate particles 25 are formed which are transferred in particulate form in a particle stream 45 out of hydrogen cyclone separator 20 via transfer device 26, as previously discussed, to calciner injector 34. A hot, vitiated air volume 47, formed by combining fuel volume 38 with air volume 40 in vitiated air generator 44 impinges and combines with the calcium carbonate particle stream 45 in calciner inlet 36 to form a calcium carbonate/vitiated air volume 49, which subsequently enters calcium oxide cyclone separator 46 of calciner 14. Within calciner 14, vitiated air volume 47 reacts with the calcium carbonate particles 25 of calcium carbonate particle stream 45 to reform the calcium carbonate particles 25 into calcium oxide particles 59 and carbon dioxide. During operation of reformation system 10, calcium carbonate is continuously reacted back to calcium oxide and returned in particulate form by steam/methane mixture 62 to hydrogen generator 12.

Figure 2:
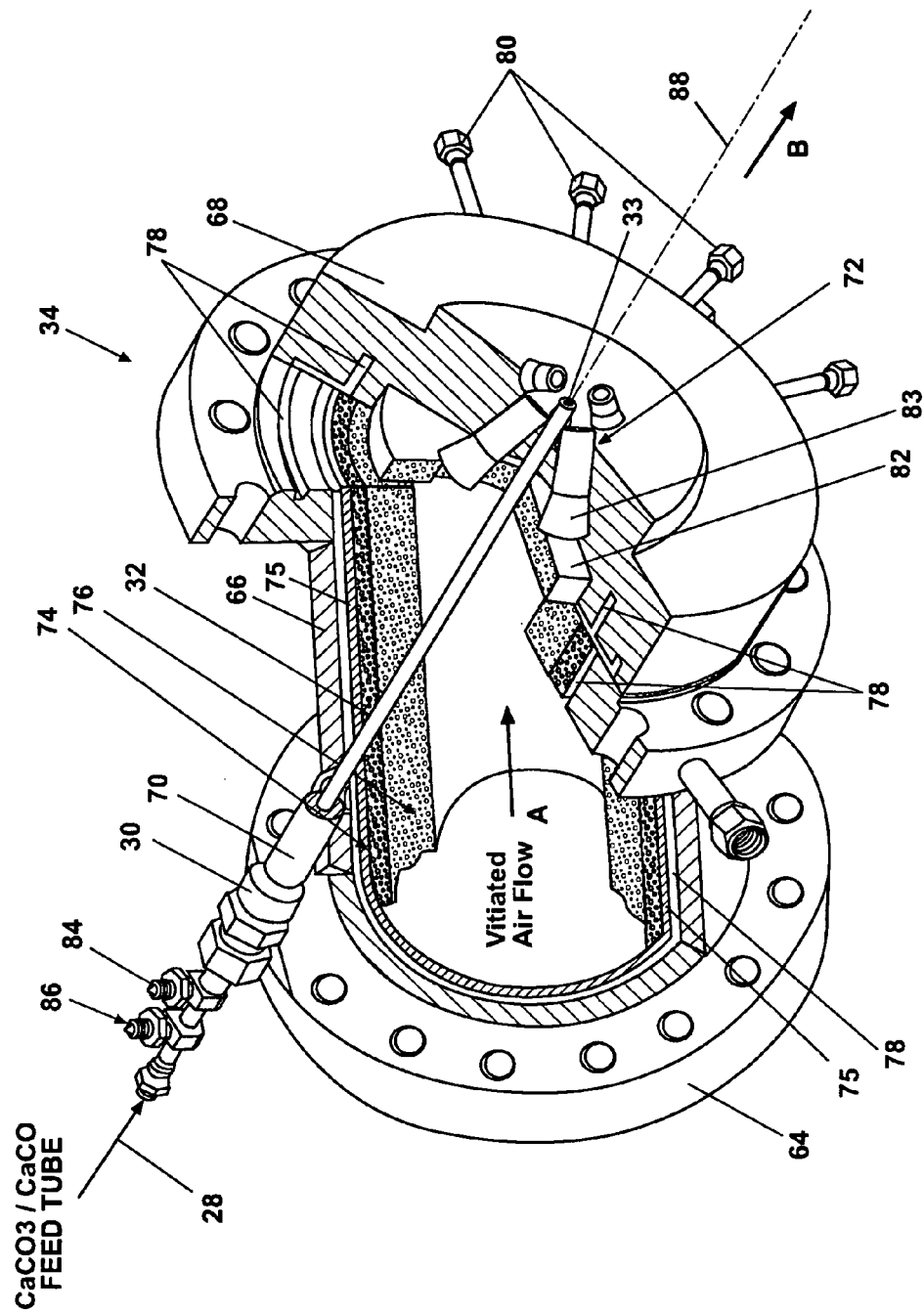
FIG. 2 is a perspective view of a calciner injector according to a preferred embodiment of the present invention.
Figure 3:
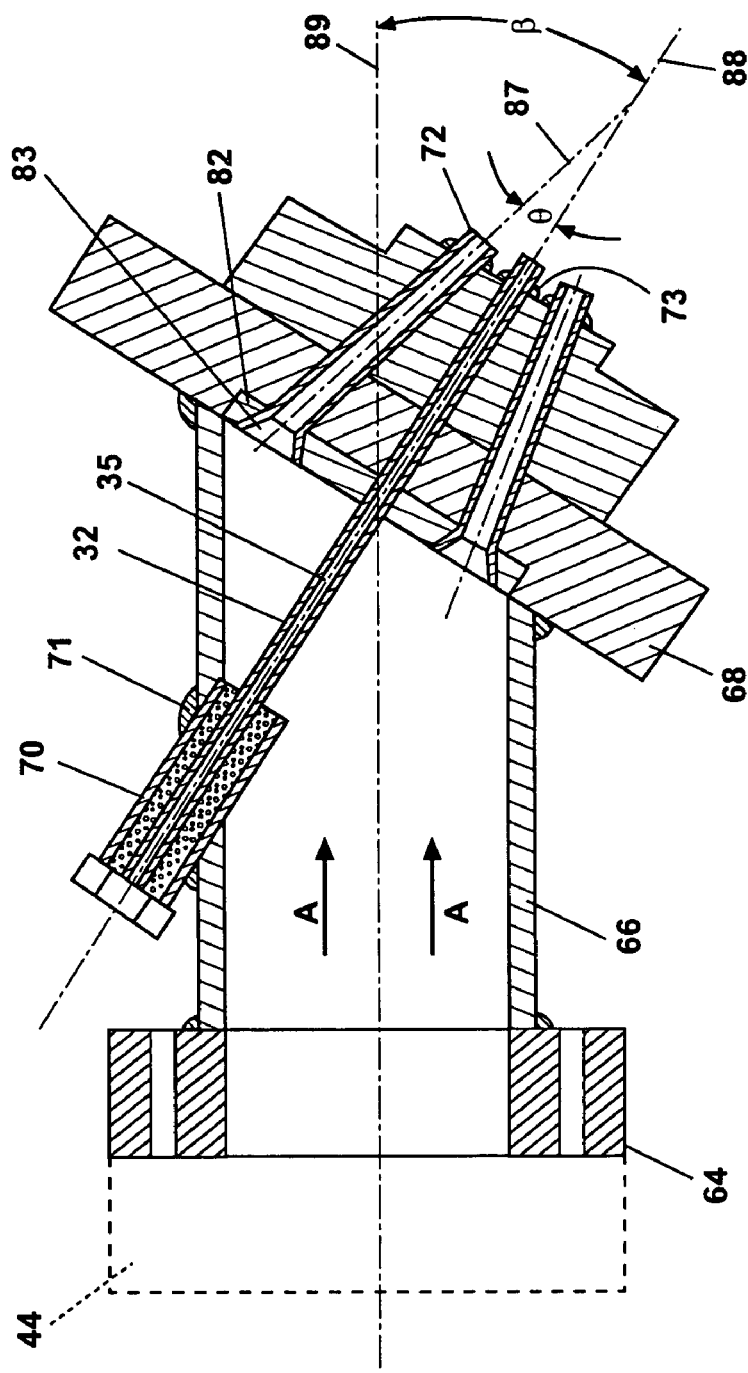
FIG. 3 is a simplified cross sectional view of the calciner injector of FIG. 2.

Referring generally to FIGS. 2 and 3, calciner injection 34 can be constructed using an inlet flange 64 connected to a body 66 (for example by welding). Body 66 can be connected to an outlet flange 68 (for example by welding). Body 66 is shown having an exemplary tubular form, but is not limited to the shape. Referring back to FIG. 1, inlet flange 64 of calciner injector 34 is fastenably connected to vitiated air generator 44, and outlet flange 68 is fastenably connected to calciner inlet 36. Return line 28 connects to flow splitter 30. Flow splitter 30 can include a body 70 from within which feed tube 32 extends. Body 70 is connected, for example by a weld joint 71 to body 66, or by a mechanical connection (not shown). Feed tube 32 extends from body 70 into body 66 and is connectively joined at a distal end, for example by a weld joint 73, to outlet flange 68. Vitiated air volume 47 initially flows in the direction of arrow "A" within body 66. A quantity of approximately four air nozzles 72 are connectively joined at outlet flange 68. Air nozzles 72 are formed as hollow, tubular elements which each collect an approximately equal portion of vitiated air volume 47. Air nozzles 72 discharge vitiated air volume 47 into calciner inlet 36. Calcium carbonate particle stream 45 is also discharged from feed tub 32 into calciner inlet 36. Each air nozzle 72 is arranged to discharge its portion of vitiated air volume 47 such that vitiated air volume 47 directly impinges calcium carbonate particle stream 45 exiting feed tube 32.

An insulation layer 74 can be formed about an inner wall 75 of body 66. In one embodiment, insulation layer 74 is formed of a ceramic fiber material in brick or block form. An additional material layer 76 can be included, which can be formed of an alumina-mullite material, or similar insulation material known in the art. Insulation layer 74 and material layer 76 can be used to insulate the material of calciner injector 34 from the high temperature of vitiated air volume 47. A coolant passage 78 can also be provided immediately adjacent to body 66. Coolant passage 78 can be provided with a coolant (not shown) such as water or other commercially available coolant via each of a plurality of coolant tubes 80. Coolant passage 78 can provide active cooling of calciner injector 34 to reduce thermal transients across calciner injector 34 induced by the high temperature (approximately 1412° C. (2600° F.) to approximately 1523° C. (2800° F.)) of vitiated air volume 47. An air nozzle setting plate 82 can also be provided which supports each of a plurality of conical sections 83 for each of the air nozzles 72. Air nozzle setting plate 82 can be formed of a ceramic material, including silicon carbide or silicon with a chromium material additive, as a ceramic matrix composite (CMC) material. Air nozzles 72 can also be formed of the CMC material. The CMC material can provide stranded silicon carbide fibers within a ceramic body providing resistance to shock damage caused by rapid temperature change.

Flow splitter 30 can be provided with its own coolant to cool feed tube 32 within splitter body 70 via a coolant inlet 84 and a coolant outlet 86 to similarly protect feed tube 32 from the high temperatures of vitiated air volume 47. A length of splitter body 70 can therefore be varied to provide coolant coverage over at least a majority of feed tube 32 within body 66. This embodiment is shown in greater detail in reference to FIG. 5.

If a single feed tube 32 is used, feed tube 32 can be coaxially aligned on a discharge centerline 88. Discharge centerline 88 is substantially perpendicular to outlet flange 68 and substantially parallel with a common centerline (not shown) of calciner inlet 36. Calcium carbonate particle stream 45 flows from feed tube 32 generally in the direction of flow arrow "B" which is substantially parallel with discharge centerline 88 in this embodiment. Air nozzles 72 each define a centerline 87 oriented to form an angle θ with respect to discharge centerline 88 of approximately 20 to 45 degrees. Angle θ can also be varied outside of the 20 to 45 degree range to suit the quantity of feed lines 32 connected to outlet flange 68. An angle θ of 30 degrees is preferred. An angle β is formed between a centerline 89 of inlet flange 64 and discharge centerline 88. Angle β is approximately 30 degrees (as viewed in FIG. 3), but can also vary depending on the quantity of feed tubes 32 and the size of calciner injector 34.

Figure 4:
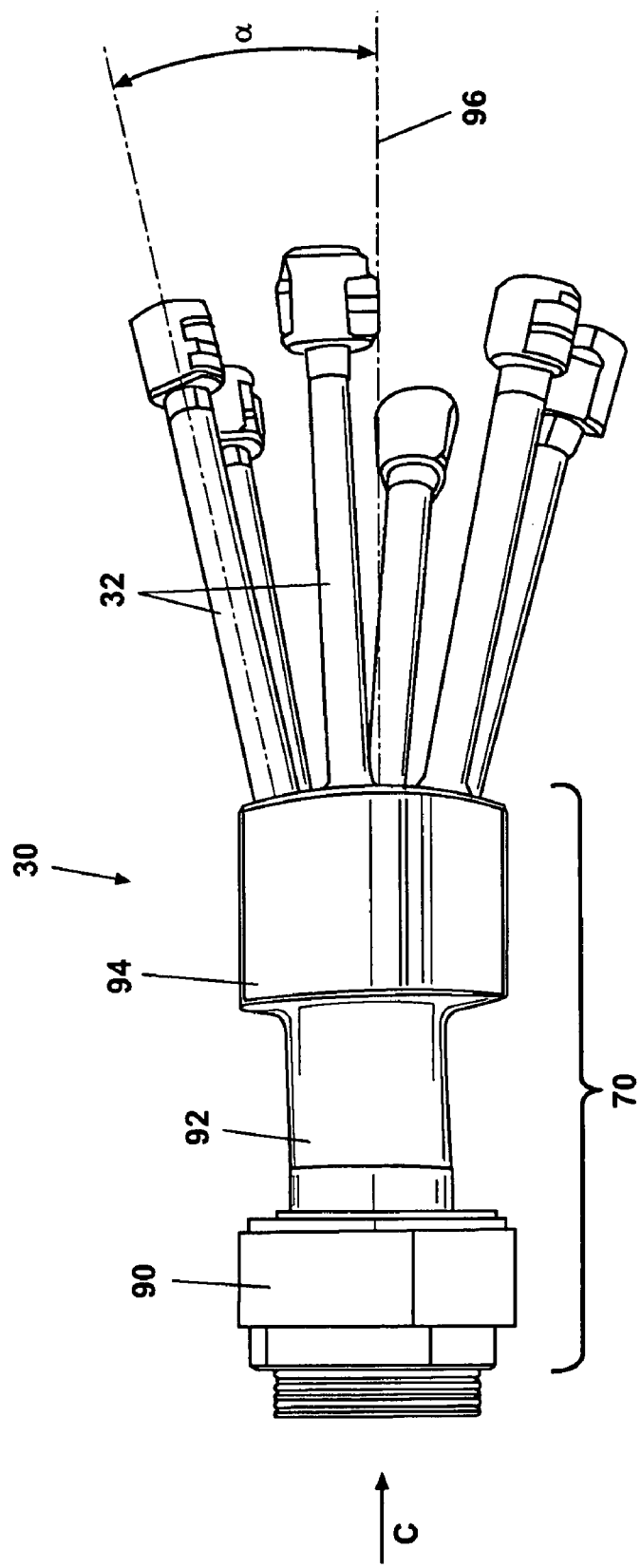
FIG. 4 is a side elevational view of a flow splitter according to a preferred embodiment of the present invention.

Referring generally to FIG. 4, and according to another embodiment of the present invention, splitter body 70 of flow splitter 30 can be provided as a connector 90, a body cylinder 92 and an adapter 94. Flow from return line 28 enters flow splitter 30 in the direction of flow arrow "C." In this embodiment, a plurality of feed tubes 32 are connectably joined to adaptor 94. The size of each of the plurality of feed tubes 32 ranges from a minimum of approximately 0.64 cm (0.25 in) outside diameter tubing to approximately 0.95 cm (0.375 in) outside diameter tubing. A minimum feed tube internal diameter of approximately 0.46 cm (0.18 in) is maintained to reduce the potential for calcium particle bridging and subsequent blocking of feed tube(s) 32. Approximately 50 tons/day of calcium carbonate flow can be achieved through an individual feed tube 32 of the 0.95 cm outside diameter tubing size. When reformation system 10 volumetric flows of calcium carbonate larger than approximately 50 tons/day are desired, the quantity of feed tubes 32 can be increased, or multiple flow splitters 30 can also be provided. Increasing the quantity of feed tubes 32 can allow the scale of calciner 14 and calciner injector 34 to be increased without increasing the quantity of calciners 14 and/or calciner injectors 34 in reformation system 10. When multiple feed tubes 32 are used, each feed tube 32 forms an angle α from a splitter centerline 96. Angle α ranges from approximately 0° to approximately 15°. An angle α of 10 degrees is preferred. Each of the plurality of feed tubes 32 receive an approximately equal percentage of flow (as each of a plurality of smaller flow streams) of calcium carbonate particle stream 45 entering adapter 94. Each feed tube 32 is individually connected to calciner injector 34, similar to the connection shown in FIG. 2. For each feed tube 32 approximately four air nozzles 72 are provided on calciner injector 34.

Material for each feed tube 32 can be provided as a Haynes® alloy 214 (a nickel based alloy) or Haynes® alloy 188 (a cobalt based alloy) material. Haynes® alloy materials are available from Haynes International, Incorporated, of Kokomo, Ind. and contain aluminum and chromium solutes (among others), which are suitable for high temperature applications. Other metals or alloys can also be used which are suitable for the temperature range within calciner injector 34. Use of Haynes® alloy 214 is particularly suitable for this service because this alloy readily produces an alumina oxide protective barrier coating when exposed to air at high temperature. This permits the addition of exterior ceramic coatings such as zirconia, yttria or similar oxide material known in the art which can act as thermal barrier coatings for each feed tube 32 to reduce thermal shock and heat transfer to the feed tubes 32. Haynes® alloy 214 is also adaptable for use as each of the inlet flange 64, body 66, and outlet flange 68 of calciner injector 34. As will be evident to persons of skill in the art, alternate materials for body components of calciner injector 34 also include Haynes® alloy 188, 304L stainless steel, 316L stainless steel, etc. which are adaptable for use at the temperature of vitiated air volume 47.

Figure 5:
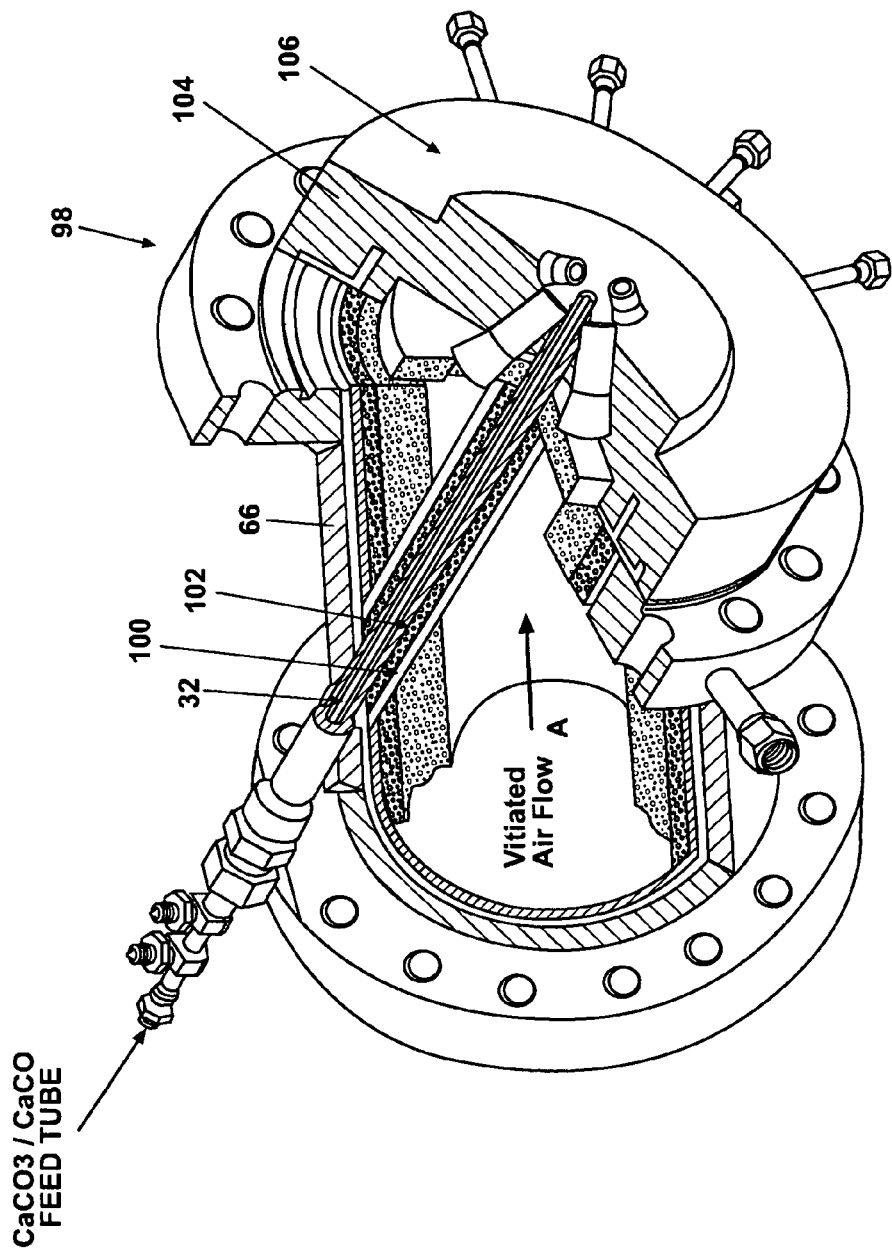
FIG. 5 is a perspective view of another preferred embodiment of a dry, low NOx calciner injector, similar to FIG. 2.

Referring now generally to FIG. 5, another embodiment including a calciner injector 98 is shown. In general, component parts of calciner injector 98 are similar to calciner injector 34, therefore only the differences between calciner injector 98 and calciner injector 34 will be further discussed. Calciner injector 98 includes at least one support tube 100 having a ceramic insulation layer 102 disposed within support tube 100 which surrounds each feed tube 32. Support tube 100 and ceramic insulation 102 reduce the potential of thermal shock of feed tube(s) 32 from the high temperature vitiated air volume 47 within body 66. Support tube 100 also provides for an internal cooling flow to cool feed tube 32. In this embodiment an outlet flange 104, made from for example a 304L stainless steel or a 316L stainless steel, can also be coated with a copper face 106. Copper face 106 protects outlet flange 104 which is directly contacted by calcium carbonate/vitiated air volume 49.

Figure 6:
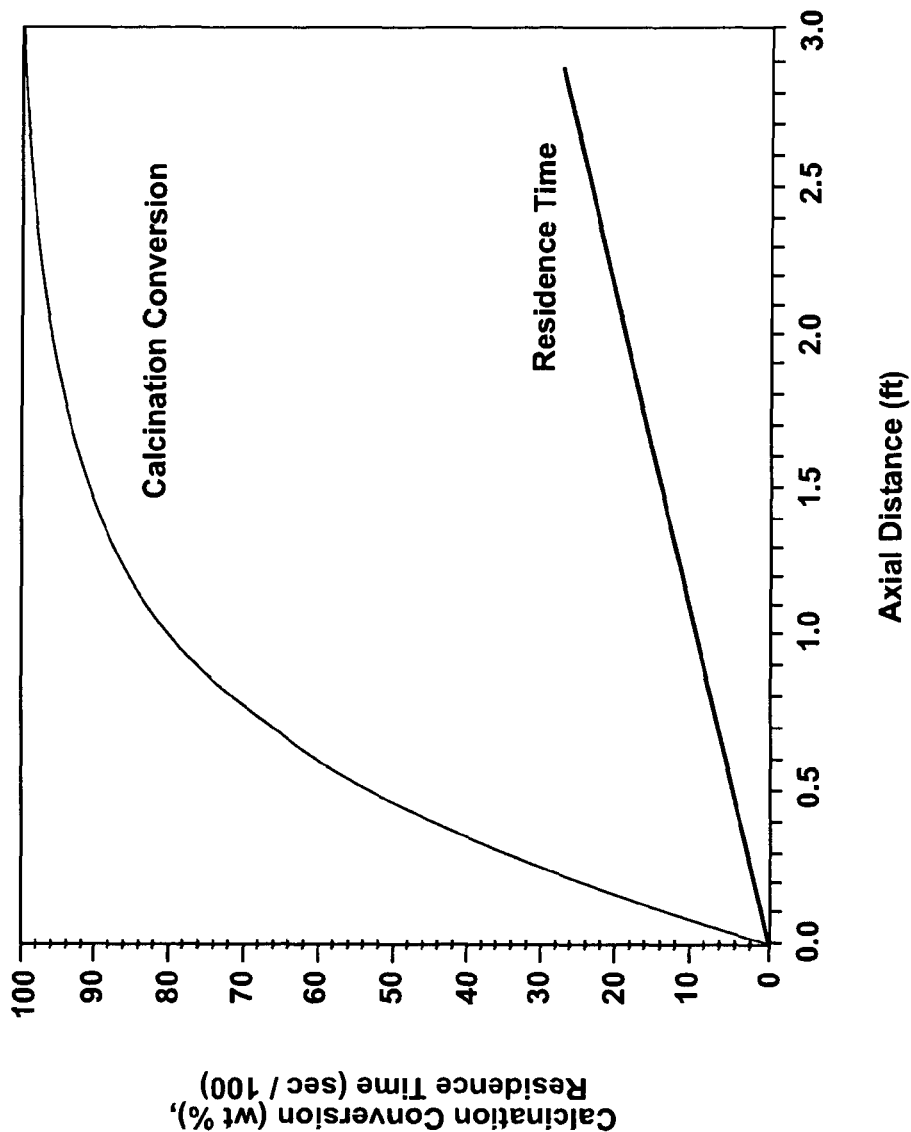
FIG. 6 is a graph having a comparison of calcination conversion percentage and residence time compared to axial distance traveled for a calcium carbonate particle after discharge from a calciner injector of the present invention.

As best seen in FIG. 6, a residence time (or complete travel time) of approximately 0.3 seconds or less is provided for the average particle of calcium carbonate during transit after discharge from feed tube 32 adjacent outlet flange 68 of calciner injector 34 to the plurality of calcium oxide particles 59 reformed in calciner 14. It is important to maintain the residence time of calcium carbonate within calciner 14 at or below 0.3 seconds to reduce the possibility of scintering the calcium particles due to the temperature of vitiated air volume 47. A velocity range for vitiated air volume 47 through each air nozzle 72 is approximately 122 m/sec (400 ft/sec) to approximately 183 m/sec (600 ft/sec). This velocity range is provided to ensure rapid mixing of the calcium carbonate particle stream 45 exiting feed tube(s) 32 with the hot vitiated air from nozzles 72. This rapid mixing minimizes the residence times for calcination to approximately 0.3 seconds which also minimizes particle sintering prior to cooling in hopper 58. An average bulk density of the calcium carbonate particles 25 within each feed tube 32 ranges from approximately 0.8 kg/m$^3$ (0.05 lbm/ft$^3$) to approximately 40.05 kg/m$^3$ (2.5 lbm/ft$^3$). A minimum bulk density of the calcium carbonate particles 25 within each feed tube 32 is approximately 0.8 kg/m$^3$ (0.05 lbm/ft$^3$). A maximum bulk density of the calcium carbonate particles 25 within each feed tube 32 is approximately 480.5 kg/m$^3$ (30 lbm/ft$^3$).

FIG. 6 also shows that maximum calcination conversion occurs within a residence time of 0.3 sec when using a calciner injector 34 of the present invention. FIG. 6 assumes an average 10 ft/sec bulk velocity to report distance after discharge from feed tube(s) 32. To achieve this rapid calcination conversion rate, a velocity range of approximately 122 m/sec (400 ft/sec) to approximately 183 m/sec (600 ft/sec) of vitiated air volume 47 exiting each of the air nozzles 72 is used to mix the calcium carbonate particle stream 45, which exits each feed tube 32 at a velocity of approximately 6.1 m/sec (20 ft/sec). The temperature of the calcium carbonate particles in calcium carbonate particle stream 45 ranges from approximately 579° C. (1100° F.) to approximately 635° C. (1200° F.). A total travel time of less than 0.3 seconds controls the exposure of the calcium carbonate particles to the higher temperature of vitiated air volume 47 (approximately 1412° C. (2600° F.) to approximately 1523° C. (2800° F.)). Maintaining residence time of the calcium carbonate particles within calciner 14 at or below approximately 0.3 seconds also keeps the level of NOx gas produced below approximately 10 parts per million and in one preferred embodiment at approximately 3 parts per million. NOx is produced in significantly greater quantities at temperatures above 1468° C. (2700° F.). Minimizing residence time of the calcium carbonate/calcium oxide particles in calciner 14 using the calciner injector 34, 98 of the present invention therefore also reduces NOx production in calciner 14.

A dry, low nitrous oxide calciner injector of the present invention offers several advantages. By rapidly mixing calcium carbonate particles with hot 1412° C. (2600° F.) vitiated air flow, NOx gas production and particle sintering is reduced by keeping the residence time low. By circulating a particulate form of calcium oxide in a system of the present invention, continuous reuse of the calcium material is possible by conversion of calcium carbonate to calcium oxide and removal of the carbon dioxide gas. The steam/methane reformation process in conjunction with the calciner injector of the present invention allows a reduced system temperature operating condition while meeting reduced NOx and component size conditions. A flow splitter of the present invention in conjunction with the calciner injector permits upscaling the calciner injector without increasing the quantity of calciners used to react the calcium carbonate back to calcium oxide.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. An injection device adaptable to transfer a plurality of calcium carbonate particles for regeneration into calcium oxide, the device comprising:

an injector body having a sidewall extending around an open internal cavity and between an inlet end adapted to receive a heated air volume into the open internal cavity and a discharge end;

an outlet flange mounted at the discharge end, the outlet flange having an inner side exposed to the open internal cavity and an outer side opposite from the inner side with at least one flow nozzle extending through the outlet flange between the inner side and the outer side that is adaptable to receive the heated air volume from the open internal cavity and discharge the heated air volume at the outer side; and at least one transfer tube extending through the sidewall of the injector body, through the open internal cavity, and through the outlet flange between the inner side and the outer side to discharge the plurality of calcium carbonate particles at the discharge end;

wherein the at least one flow nozzle is angularly oriented to directly impinge the plurality of calcium carbonate particles discharged from the at least one transfer tube with the heated air volume.

2. The device of claim 1, wherein the injector body comprises:

an inlet flange operably forming the inlet end; and a tubular body portion disposed between the inlet and outlet flanges.

3. The device of claim 2, comprising:

a wall of the tubular body portion; and a cooling channel disposed within the wall of the tubular body portion.

4. The device of claim 2, comprising:

a wall of the tubular body portion; and at least one layer of insulation disposed within the tubular body portion and adjacent the wall.

5. The device of claim 2, wherein the at least one transfer tube comprises:

an internal flow passage; a connector adapted for mechanical connection to the tubular body end; and a discharge end adapted for connection to the outlet flange; wherein the internal flow passage of the at least one transfer tube is configurable to discharge the plurality of calcium carbonate particles operably transferred through the internal flow passage from the discharge end and external to the injector body.

6. The device of claim 1, wherein the at least one transfer tube comprises a tube outer diameter ranging from approximately 0.64 cm to approximately 0.95 cm.

7. The device of claim 6, wherein the at least one transfer tube comprises a minimum internal diameter of approximately 0.46 cm.

8. The device of claim 1, wherein the injector body comprises at least a nickel-chromium containing alloy material.

9. The device of claim 1, wherein the injector body comprises a steel material.

10. The device of claim 1, wherein the at least one transfer tube comprises at least a nickel-chromium containing alloy material.

11. The device of claim 1, wherein the at least one transfer tube comprises a steel material.

12. The device of claim 1, wherein the at least one flow nozzle comprises a ceramic material.

13. The device of claim 2, wherein the inlet flange and the outlet flange each include a centerline axis, and the axes are non-parallel relative to each other.

14. The device of claim 2, wherein the outlet flange includes a copper coating on a steel substrate.

15. An injection device comprising:

a tubular body having an open internal cavity extending along a first central axis between a inlet end and a discharge end;

an outlet flange at the discharge end, the outlet flange including an inner side exposed to the open internal cavity, an outer side opposite from the inner side, and at least one nozzle opening extending between the inner side and the outer side that is fluidly connected with the open internal cavity of the tubular body; and a feed tube extending along a second central axis through the open internal cavity and through the outlet flange between the inner side and the outer side adjacent to the at least one nozzle opening, the first central axis being non-parallel relative to the second central axis.

16. The device of claim 15, wherein the first axis and the second axis are non-perpendicular relative to each other.

17. The device of claim 15, wherein the first axis is oriented at an angle of about 30° relative to the second axis.

18. The device of claim 15, wherein the outlet flange includes a copper coating on a steel substrate.

19. The device of claim 15, wherein the at least one nozzle opening extends along a third axis that is non-parallel and non-perpendicular relative to the first axis and the second axis.

20. The device of claim 15, wherein the feed tube extends through the internal cavity.

21. The device of claim 1, wherein the open internal cavity surrounds at least a portion of the at least one transfer tube.

22. The device of claim 15, wherein the open internal cavity surrounds at least a portion of the feed tube that extends through the open internal cavity.

* * * * *